BEST AVAILABLE COPY T 857,026

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 20 cents per sheet.

Applications published under the Defensive Publication Program have not been examined as to the merits of alleged invention. The Patent Office makes no assertion as to the novelty of the disclosed subject matter.

PUBLISHED DECEMBER 17, 1968

857 O.G. 695

587,971

PRODUCTION OF METADIOXANES

Neville Leverne Cull, Rte. 2, Box 262, Baker, La. 70714, and William Lambert Senn, Jr., 850 E. Lakeview Drive, Baton Rouge, La. 70810

Filed Oct. 20, 1966. Published Dec. 17, 1968

Class 260—340.7

No Drawing. 7 Pages Specification

Metadioxane is prepared by reacting a monoolefin with formaldehyde in the presence of Amberlyst 15 ion exchange resin. Desirably, the reaction is conducted at temperatures ranging from 70 to 90° C. and at pressures varying from 1 to 10 atmospheres. The reaction is ordinarily carried out in a polar, inert solvent such as tetrahydrofuran. Amberlyst 15 is a hydrogen form ion-exchange resin having a macro reticular structure. In a preferred embodiment, styrene is reacted with formaldehyde in the presence of the ion-exchange resin to form phenylmetadioxanes. The phenylmetadioxanes can be hydrogenated to 3-phenyl-propanol-1.